United States Patent
Earl

[15] 3,635,691
[45] Jan. 18, 1972

[54] METHOD FOR PRODUCING PELLETIZED AMMONIUM SULFATE-AMMONIUM NITRATE MATERIAL

[72] Inventor: Alma L. Earl, American Fork, Utah
[73] Assignee: United States Steel Corporation
[22] Filed: Jan. 1, 1969
[21] Appl. No.: 820,839

[52] U.S. Cl..................................71/59, 71/64 DB, 71/64 E
[51] Int. Cl...............................C05c 1/02, C05c 3/00
[58] Field of Search.............71/58, 59, 64 DA, 64 DB, 64 E

[56] References Cited

UNITED STATES PATENTS

| | | | |
|---|---|---|---|
| 3,012,874 | 12/1961 | Phillips et al. | 71/64 DA |
| 3,048,478 | 8/1962 | Smith | 71/64 D X |
| 3,092,489 | 6/1963 | Smith | 71/64 DA |
| 3,348,938 | 10/1967 | Sherrington et al. | 71/64 DA X |
| 2,912,317 | 11/1959 | Gloss | 71/24 |
| 2,976,138 | 3/1961 | Hester | 71/1 |
| 3,021,207 | 2/1962 | Stengel | 71/60 X |
| 3,282,674 | 11/1966 | Mohr et al. | 71/64 DB |

FOREIGN PATENTS OR APPLICATIONS 1,005,533  4/1957  Germany..............................71/64 DB

*Primary Examiner*—Reuben Friedman
*Assistant Examiner*—Bennett H. Levenson
*Attorney*—Gene Harsh

[57] ABSTRACT

A method for improving an ammonium-sulfate fertilizer material comprising feeding ammonium sulfate and liquid ammonium nitrate to a pelletizing pan, rotating said pan until pellets of a predetermined size are formed and separating from said pan the so-formed pellets of improved fertilizer material comprising ammonium sulfate and ammonium nitrate. So-called trace elements or micronutrients may be incorporated in the pellets.

4 Claims, 3 Drawing Figures

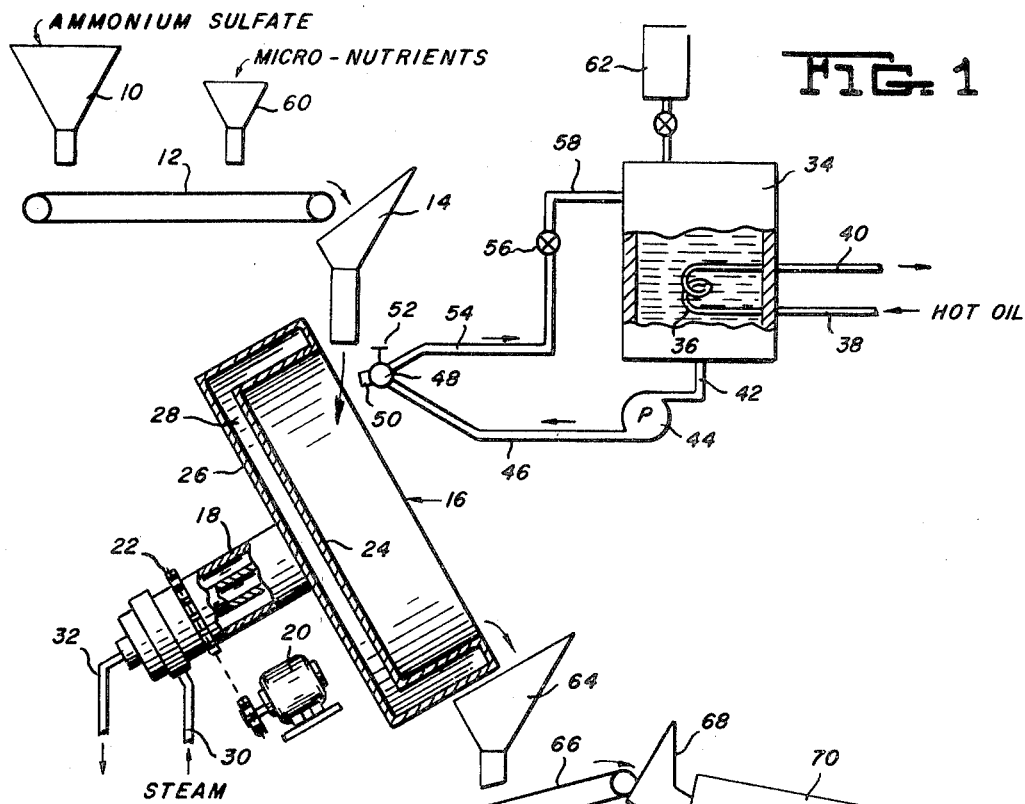
FIG. 1
FIG. 2
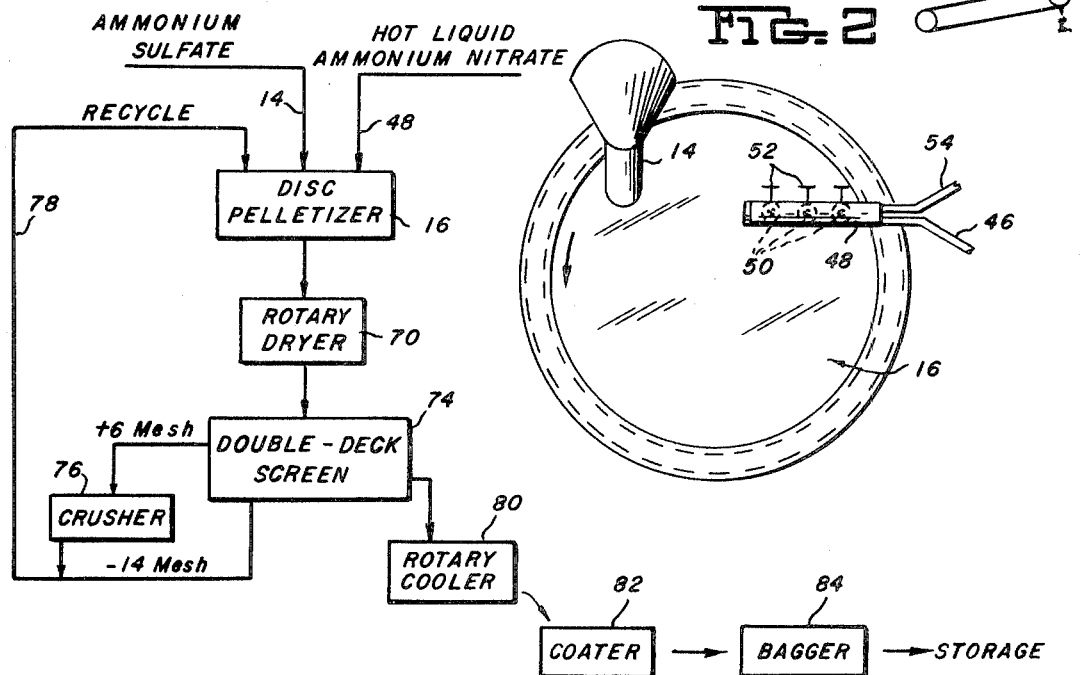
FIG. 3
INVENTOR
ALMA L. EARL
By Walter W. Tetzlaff
Attorney

3,635,691

METHOD FOR PRODUCING PELLETIZED AMMONIUM SULFATE-AMMONIUM NITRATE MATERIAL

BACKGROUND OF THE INVENTION

1. Field of the Invention

This invention relates to a method for improving ammonium-sulfate fertilizer material to increase its particle size and the nitrogen content thereof, giving a material having a smooth surface and good texture with improved release of nitrogen and of micronutrients or trace elements when the material is applied as a fertilizer to the soil. More particularly, my invention relates to a method of spraying ammonium sulfate with hot liquid ammonium nitrate and then forming a pellet of predetermined size. Trace elements are added, as required, before forming the pellet.

2. Description of the Prior Art

With varying soil conditions and crop requirements, much of the fertilizer material that is used in an area is conventionally dry mixed, as required. Thus, ammonium sulfate, ammonium nitrate, ammonium phosphate, treble superphosphate and the like are mechanically mixed in various proportions. One or more micronutrients or trace elements may be added during mixing to a dry-mix batch containing one or more of the above materials. Among the disadvantages of dry mixing are improper mixing because of different particle sizes of the materials and segregation in transit, which may result in nonuniform field application.

SUMMARY OF THE INVENTION

Ammonium sulfate is fed to an apparatus, variously known as a pelletizing or balling pan or disc. To the rotating pelletizing pan there is also fed hot, liquid ammonium nitrate. When the ammonium nitrate contains between about 10 and 20 percent water and is at a temperature between about 250° and 300° F., the pelletizing pan will produce smooth-surfaced pellets of a predetermined size range, if the residence time of the sulfate-nitrate mixture in the pan is at least about 0.6 minute. The preferred predetermined size range of a major portion of the pellets is between about 6 to 14 U.S. mesh. This size range has been found to be quite satisfactory for distribution to the soil from commercial, fertilizer spreaders. A pellet having a preferred smooth surface is formed by my method when the weight ratio, on a dry basis, of ammonium sulfate to ammonium nitrate is no greater than about 70 to 30. Depending on such factors as time of use, packaging, transportation and the like, the pellets comprising ammonium sulfate and ammonium nitrate may, after separation from the pan, be dried, screened, cooled, and treated with an inert coating material to prevent caking. One or more salts of elements such as iron, copper, zinc, manganese, lithium and the like and boric acid are sometimes incorporated in small quantities in fertilizer materials. These are the so-called trace elements or micronutrients. I may incorporate trace elements in my pellets, for example, by mixing the salts with the ammonium-sulfate feed or by adding solutions thereof to the liquid ammonium nitrate feed.

The advantages of my method over prior art dry-mixing methods include the provision of:

1. The precise uniform type of a fertilizer material required by an individual customer.
2. A uniform pellet having a smooth surface and good texture that will not abrade excessively in a spreader.
3. A pellet having a unique twofold release of nitrogen. There is a rapid release from the ammonium nitrate and a slower release from the ammonium sulfate depending on the oxidation of the latter by soil bacteria. The latter release may take 2 to 3 weeks, depending on the soil.
4. A method wherein the apparatus is relatively inexpensive, with low maintenance costs.

BRIEF DESCRIPTION OF THE DRAWING

A complete understanding of the invention may be obtained from the following detailed description and explanation which refer to the accompanying drawing, illustrating the present preferred embodiment.

In the drawing:

FIG. 1 shows in schematic form, in elevation, an arrangement of apparatus connected together to perform the method of invention;

FIG. 2 shows in schematic form, in a plan view, an arrangement of a pelletizing pan and the feed means thereto; and FIG. 3 shows in block diagram form further embodiments of apparatus arrangement to perform the method of invention.

DESCRIPTION OF THE PREFERRED EMBODIMENT

Referring now in detail to FIGS. 1 and 2 of the drawing, a hopper 10 represents a supply means for ammonium sulfate powder that may have a screen analysis of about 90 percent by weight of 30 to 70 U.S. mesh. Depending on the source of the sulfate, the moisture content thereof may vary between about 0 and 3 percent by weight. From hopper 10 the sulfate passes over a driven conveyor 12 and through a chute 14 to a pelletizing pan 16. Chute 14 is preferably positioned to discharge on the down-rotation side of pan 16 as illustrated in FIG. 2, in order not to interfere with uniform pelletization under the spray header. This well-known apparatus is variously called a pelletizing or balling pan or disc. Pan 16 is inclined to the horizontal and is supported on a hollow shaft 18 which is rotated by a motor 20 through a drive 22. Pan 16, may have upper and lower surfaces 24, 26, respectively, defining a closed chamber 28, heated, for example, by a steam line 30 and drained by an exhaust line 32. While heating is not required, equilibrium in uniform pellet formation may be established more quickly at the beginning of a pelletizing operation by heating surface 24 to about 150° F., for example. After a few minutes operation such heating may be discontinued.

Ammonium nitrate in a tank 34 is maintained liquid at a preferred temperature by a heating coil 36, supplied by hot oil, or the like, from a source, not shown, by a supply line 38 and a return line 40. Liquid ammonium nitrate is sprayed on ammonium sulfate in pelletizing pan 16 by a supply system which may comprise a line 42 from tank 34, a pump 44, a line 46, a spray header 48, equipped with a plurality of spray nozzles 50, each nozzle controlled by a valve 52, a line 54, a pressure-regulating valve 56 and a return line 58 to tank 34. It is obvious the customary valves, drain lines, flushing lines, insulation and the like should be included for good operation.

I have found that a number of variables effect the production of preferred pellets of ammonium sulfate and ammonium nitrate, namely, pellets having smooth surfaces, and good texture, the major portion of said pellets falling in a size range between about 6 to 14 U.S. mesh. It was found that hot, liquid ammonium nitrate should contain some water to develop good pellet texture. The water content may be between about 10 and 20 percent by weight, preferably between about 13 and 17 percent. Pellet texture becomes progressively more difficult to control when the water content is decreased below about 13 to 10 percent and therebeyond. Above about 20 percent water, the load on any subsequent drying operation would increase unduly. The ammonium nitrate temperature, as sprayed, should be between about 250° and 300° F., preferably between about 280° and 290° F. Preferably, the greater the water content, the higher the temperature should be and vice versa. Ammonium-sulfate crystals usually have a water content between about 0 percent and 3 percent by weight. Preferably, the total water content of the mixture in pan 16 should not be above about 20 percent by weight.

Another variable that must be controlled is the residence time of the mixture in pan 16. This time may be between about 0.6 and 2 minutes, preferably between about 1 and 1.5 minutes. Smooth pellets are not obtained when the residence time is less than about 0.6 minutes. Beyond about 2 minutes, the texture does not appear to be improved and the throughput becomes less. The preferred residence time is obtained by varying pan rotation between about 12 and 18 r.p.m. and by inclining the pan between about 56° and 61° from the horizontal. Within these ranges, faster rotation may be used with a larger angle of inclination and vice versa. The weight ratio on a dry basis of ammonium sulfate to ammonium nitrate should not be greater than about 70 to 30. Higher proportions of ammonium sulfate cause irregular pellet shapes and irregular operation of the pelletizing pan.

It is known that soils should contain certain chemical elements in small quantities for good crop yields. These are the so-called micronutrients or trace elements in salt or acid form. Among micronutrients used are salts of aluminum, boron, copper, lithium, manganese and zinc and boric acid. It has been found that each of the micronutrients should be compatible with all other micronutrients to prevent precipitation when added to an ammonium nitrate solution. Sulfates and boric acid have been found to be preferable. Turning again to FIG. 1, micronutrients may be incorporated in an ammonium sulfate-nitrate pellet, for example, by feeding micronutrients individually from one or more hoppers 60 to conveyor 12 and chute 14 to pan 16. In another embodiment, solutions of individual micronutrients, preferably saturated solutions thereof may be fed to ammonium nitrate tank 34 from one or more tanks 62. As discussed above for wet ammonium sulfate, it is preferred that the total water content of the mixture of sulfate, nitrate, and micronutrients in pan 16 should not exceed about 20 percent by weight of water. It has been found that when operating within the above ranges or limits, the pellets will have a smooth surface and good texture and that at least about 85 percent by weight of the pellets will be in a size range between about 6 to 14 U.S. mesh.

It is obvious that such factors as customer requirements, storage requirements, quantities shipped, and the like will affect the further treatment of the pellet product from pan 16. When operating within the above limits, the moisture content of the pellets from pan 16 will average from 4 to 6 percent water by weight. It is usually preferred to reduce this moisture content, for example, in a conventional rotary dryer to minimize agglomeration or caking of the pellets. Turning again to FIG. 1, pellets leave pan 16 and pass serially through a chute 64, over a conveyor 66, through a chute 68, to and through a rotary drier 70, and over a conveyor 72 for further disposition. The latter may include such operations, with conventional equipment, as screening, crushing, recycling, drying, coating, bagging and storage, as shown in FIG. 3. In this figure, pan 16 receives ammonium-sulfate crystals through a chute 14 and liquid ammonium nitrate through a spray header 48.

The pellet product from pan 16 is dried, as required, in a rotary dryer 70 and is then screened preferably in a double-deck screen 74 to separate material smaller than 14 mesh and larger than 6 mesh, the latter being crushed in a crusher 76. The offsize material may be recycled to pan 16 over a conveyor 78. When operating within the above-described limits, the pellet product has the preferred smooth surface and good texture. Additionally, at least about 85 percent by weight of the pellets are within the 6 to 14 mesh size range. It has been found that the separated off-size material may be recycled to the pelletizing pan, after crushing oversize material. The 6 to 14 mesh pellets may then be cooled in a conventional rotary cooler 80 using a blast of air and coated in a rotary coater 82 with some inert material, for example, about 0.5 percent by weight of talc or about 1 percent by weight of bentonite, to minimize caking. This may be done where it is expected that the bagged material will be stored in a high-moisture environment. Other commercial coating materials are available. From the coater, the pellets may be packed in bags by a bagger 84 and stored.

Pellets manufactured under the above-described conditions and limits, leaving pan 16, will have a moisture content of about 4 to 6 percent and a temperature of about 140°-150° F. The moisture content may be reduced, as required, in a rotary dryer using an air blast heated to about 250°-300° F. It has been found that the drying rate would not be increased appreciably at a blast temperature much above 300° F. Drying time would increase when using a temperature less than about 250° F. The preferred moisture content after drying varies with the subsequent handling. When the pellets are dried to about 2 percent moisture and allowed to cool on a storage floor, further moisture is given up and the cooled product may then have a moisture content of about 0.05 percent. It can then be screened and bagged. The bagged product will not cake in storage. Where the pellets must be bagged immediately and to avoid caking in storage, it has been found that the moisture content should be reduced to below about 0.25 percent and the pellets should be cooled in a rotary cooler to below about 100° F.

The invention may be further understood from the following explanation of typical examples of my process.

About 5.50 pounds per minute of ammonium sulfate having a moisture content of about 2 percent was fed to a pelletizing pan having a diameter of about 3.3 feet, set at an angle to the horizontal of about 59° and rotating at about 15 r.p.m. The sulfate was sprayed with about 5.50 pounds per minute of ammonium nitrate solution at a temperature of about 285° F. and having a water content of about 14 percent. About 0.03 pounds per minute of recycle material was fed to the pan as explained hereinafter. Under these conditions the pelletizing or residence time was about 1.5 minutes and the production was about 0.35 tons per hour of pellets having a temperature of about 140° F. and having a moisture content of about 5 percent. The pellets were fed to a rotary dryer, 2.5 feet in diameter and 20 feet long, equipped with an excess-air burner that supplied inlet gas at a temperature of about 300° F. and produced a 0.2 percent moisture product at a residence time of about 26 minutes.

The pellets were than passed to a double-deck screen having a 6-mesh screen and a 14-mesh screen. The amount of recycle material from these screens over a series of tests ranged between 5 and 12 percent by weight and averaged about 8 percent of the screen feed. Of the 8 percent, about 1 percent was oversize material which was pulverized before being returned to the pelletizing pan and about 7 percent was undersize material which was conveyed directly to the pelletizing pan. No effect on pelletization or on pellet quality was detected with or without recycle material to the pan. With a cold startup, the pan produced more oversize material for some minutes before establishing equilibrium. When chamber 28 of the pan 16 was heated to about 150° F. prior to any feed to the pan, the pellets were of uniform size and quality almost from the start. The pellets were then fed to a small, rotating cooling drum, 1 foot in diameter and 10 feet long, equipped with a blower that cooled the pellets to about 85° F. at a residence time of about 15 minutes. This product exhibited the preferred smooth surface and good texture. It was then bagged and did not cake after several weeks storage.

Tests were conducted in the above-described pilot plant in which saturated solutions of cupric sulfate, manganese sulfate, zinc sulfate and boric acid were mixed with ammonium nitrate solution prior to pelletizing. It was found that these compounds were taken into the pellets, the pelletization operation continued normally and the final product was physically unaffected except for slight color changes.

For all the above-described products when produced within the defined limits, evaluation of handling characteristics showed that the products were placed in field plots by ordinary spreading equipment with no difficulty and with a minimum of abrasion and dust.

While the above examples illustrate the preferred embodiment of my invention, it should be pointed out that the pilot-plant operation may be modified to establish the broad and preferred operating ranges disclosed in the specification.

Although I have disclosed herein the preferred practice of my invention, I intend to cover as well any change or modification therein which may be made without departing from the spirit and scope of the invention.

I claim:

1. A method for producing ammonium sulfate-ammonium nitrate fertilizer material comprising:
   a. feeding ammonium sulfate powder having a screen analysis of about 90 percent by weight of 30–70 U.S. mesh and a 0–3 percent by weight water content onto a pelletizing pan;

b. spraying a liquid ammonium nitrate onto said ammonium sulfate powder to form a mixture therewith said liquid ammonium nitrate containing about 10–20 percent by weight of water, said liquid nitrate being at a temperature of about 250–300° F., the greater the water content the higher the temperature, the total water content not exceeding about 20 percent by weight, said ammonium sulfate being in a ratio to said ammonium nitrate no greater than about 70/30 on a dry basis;

c. pelletizing said mixture on said pan for at least about 0.6 minutes so that at least about 85 percent of the pellets formed are within a size range of about 6–14 U.S. mesh and have a smooth surface, a good texture, and a water content of about 4–6 percent by weight; and d. separating from said pan the so formed pellets.

2. The method of claim 1 wherein the temperature of the liquid ammonium nitrate is about 280°–290° F.

3. The method of claim 1 wherein a saturated aqueous solution selected from the group of micronutrient salts of aluminum, copper, lithium, manganese, zinc and of boric acid is added to the mixture of ammonium sulfate and liquid ammonium nitrate to provide trace elements in the subsequently formed pellets, the total water content being maintained below about 20 percent by weight.

4. The method of claim 3 wherein the saturated solution is mixed with the liquid ammonium nitrate, which mixture is then added to the ammonium sulfate powder.

* * * * *